(No Model.)

S. INGERSOLL.
THRUST BEARING FOR SHAFTS.

No. 507,682. Patented Oct. 31, 1893.

WITNESSES
H. A. Lamb
Pearl Reynolds

INVENTOR
Simon Ingersoll
By A. M. Wooster
Atty.

UNITED STATES PATENT OFFICE.

SIMON INGERSOLL, OF GLENBROOK, ASSIGNOR OF THREE-FOURTHS TO AYRES BROTHERS, OF STAMFORD, CONNECTICUT.

THRUST-BEARING FOR SHAFTS.

SPECIFICATION forming part of Letters Patent No. 507,682, dated October 31, 1893.

Application filed March 3, 1893. Serial No. 464,597. (No model.)

*To all whom it may concern:*

Be it known that I, SIMON INGERSOLL, a citizen of the United States, residing at Glenbrook, in the county of Fairfield and State of Connecticut, have invented certain new and useful Improvements in Thrust-Bearings for Shafts; and I do hereby declare the following to be a full, clear, and exact description of the invention, such as will enable others skilled in the art to which it appertains to make and use the same.

My invention has for its object to provide a thrust bearing for shafts, more especially adapted for use upon the propeller shafts of steam vessels, which shall be inexpensive, durable and practically impossible to get out of repair and in which the friction shall be reduced to the minimum and the necessity for slippage shall be practically eliminated.

With these ends in view I have devised the simple and novel construction of which the following description in connection with the accompanying drawings is a specification, numbers being used to designate the several parts.

Figure 1:
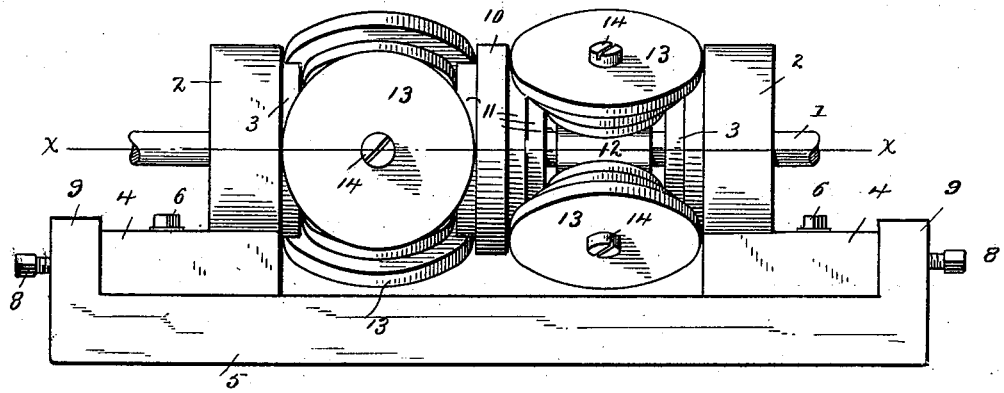
Figure 2:
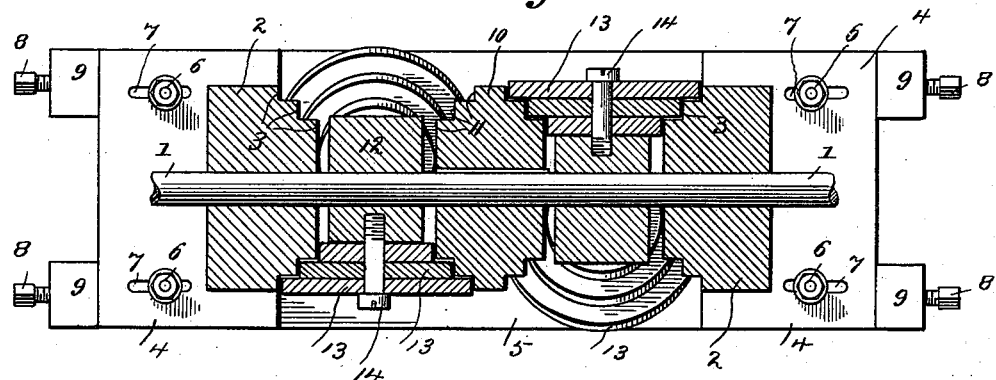
Figure 3:
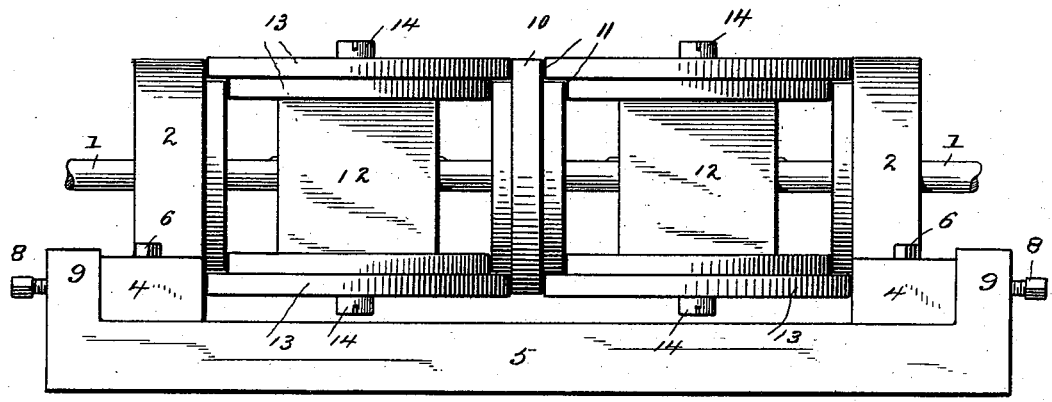

Figure 1 is a side elevation of my novel bearing the rollers appearing in perspective; Fig. 2 a section on the line $x\,x$ in Fig. 1 looking down, and Fig. 3 is a side elevation illustrating certain obvious modifications in the details of construction.

1 denotes the shaft which is journaled in bearings 2 the operative faces of which consist of a series of steps or shoulders 3. These bearings are formed integral with or rigidly secured to base plates 4 which rest upon a bed plate 5. The bearings are made adjustable in order that lost motion may be taken up by means of bolts 6 which pass through slots 7 in the base plates and engage the bed plate. The base plates and bearings are also additionally locked in position by means of set screws 8 which pass through abutments 9 at the outer ends of the bed plate and bear against the rear edges of the base plates. It will be seen that by means of these bolts and set screws I am enabled to get a very fine adjustment and to lock the base plates and bearings rigidly in position after adjustment.

10 denotes a collar which is keyed or otherwise rigidly secured to the shaft the opposite faces of which are provided with steps or shoulders 11 which correspond with steps or shoulders 3 on the operative faces of the bearings.

12 denotes blocks on the shaft which turn freely thereon and carry series of rollers 13 journaled on screw pins 14 which engage the blocks. The peripheries of these rollers engage corresponding steps on the faces of the bearings and on the faces of collar 10. The outer roller is of greatest diameter, the diameters of the rollers in the several series decreasing inward in uniform ratio so as to bear on the successive steps of the bearings and collar. This construction insures that all of the rollers will rotate at the same rate of speed thereby wholly avoiding friction between the rollers themselves.

I have illustrated my novel thrust bearing as made double so as to provide for the taking up of friction in backing as well as when the shaft is turning forward. It is obvious that when the shaft is turning forward one of the blocks and the rollers carried thereby will be in use, the other block and the rollers carried thereby being wholly out of use; and that when the shaft is backing the block and rollers that were in use during the forward movement will be out of use, and the other block will be in use and the rollers carried thereby will take up the entire thrust of the shaft. In order to prevent the possibility of screw pins 14 by which the rollers are carried being turned out, I make the threads upon the screw pins in the two blocks reverse threaded so that when either block is in use the action of the rollers is to turn the screw pins in, it being in fact rendered impossible for them to be turned out in use.

The number of rollers in each series is not of the essence of my invention, nor is the number of series of rollers on each block of the essence of my invention. In Figs. 1 and 2 I have shown each block as carrying three series of rollers and have shown three rollers in each series. In Figs. 1 and 2 I have furthermore shown the diameter of each roller as corresponding with the diameter of the step or plane upon which it travels. This however is not an essential feature of my invention. It has been found in practice that it is desirable to make the rollers as large as possible and also to make them as thin as possible consistent with the required degree of strength so as to reduce the sliding friction between the peripheries of the rollers and the planes upon which they travel to the minimum. In Fig. 3 I have therefore illustrated a form of my invention in which two series of rollers only are used upon each block and have shown two rollers only in each series. These rollers furthermore are made of much greater diameter than the steps or planes upon which they travel.

Having thus described my invention, I claim—

1. The combination with a shaft having a collar provided with steps 11 on its faces, of bearings in which said shaft is journaled and which are provided with corresponding steps on their inner faces, and blocks which turn freely on the shaft and are provided with series of rollers which engage the corresponding steps upon the faces of the bearings and the collar.

2. The combination with the shaft having a collar fixed thereon the faces of said collar consisting of series of steps, of bearings in which said shaft is journaled the inner faces of said bearings consisting of series of steps corresponding with the steps on the collar, and blocks adapted to turn on said shaft and carrying series of rollers adapted to bear upon corresponding steps on the faces of the collar and the bearings, the diameter of each roller corresponding with the diameter of the step or plane upon which it travels.

3. The combination with the shaft carrying a collar the operative faces of which consist of series of steps, of bearings in which said shaft is journaled, the inner faces of said bearings consisting of series of steps corresponding with the steps on the collar, slotted base plates by which the bearings are carried, suitable means for locking said base plates and bearings in position after adjustment, and blocks adapted to turn on the shaft and carrying series of rollers adapted to engage corresponding steps upon the opposite faces of the collar and the inner faces of the bearings.

In testimony whereof I affix my signature in presence of two witnesses.

SIMON INGERSOLL.

Witnesses:
THOS. F. DOUGHTY,
WILLIAM F. WATERBURY.